Dec. 5, 1939.  J. B. HENNESSY  2,182,724
PIPE AND VALVE FOR CONTROLLING THE FLOW OF FLUID THERETHROUGH
Filed June 6, 1938
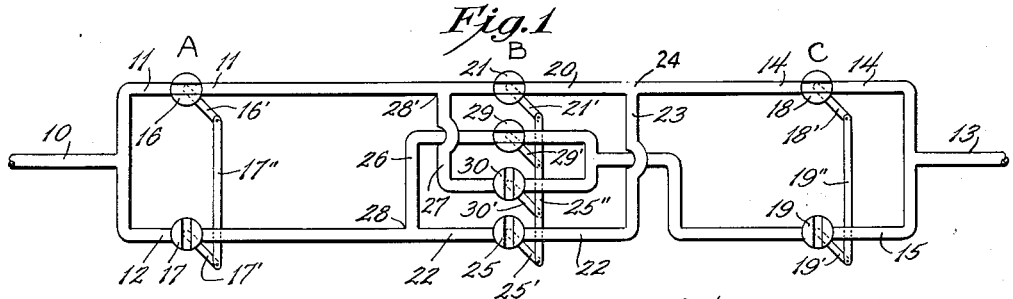
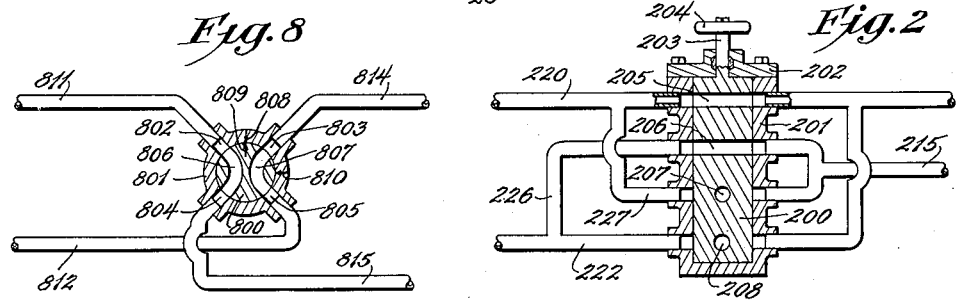
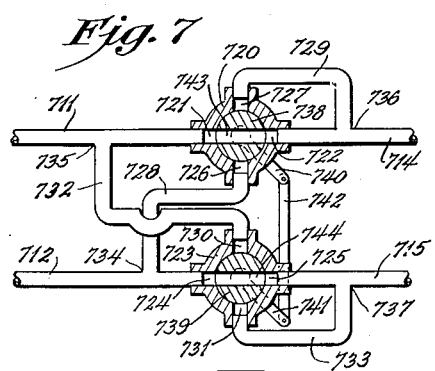
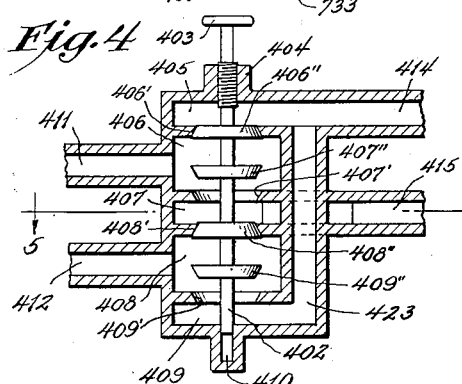
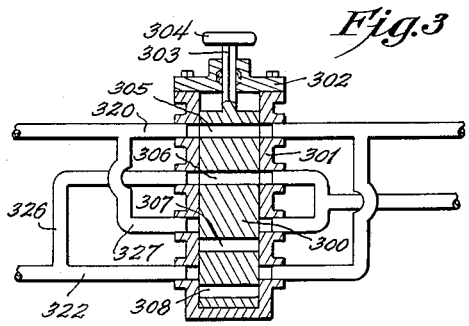
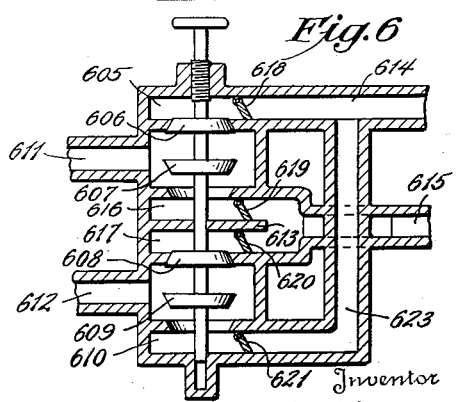
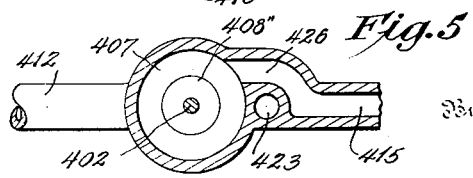
Inventor
John Brendan Hennessy
By Francis H. Templeton
Attorney Patented Dec. 5, 1939

2,182,724

UNITED STATES PATENT OFFICE 2,182,724

PIPE AND VALVE FOR CONTROLLING THE FLOW OF FLUID THERETHROUGH

John Brendan Hennessy, San Francisco, Calif.

Application June 6, 1938, Serial No. 212,181

1 Claim. (Cl. 137—78)

This invention relates to pipes and valves for controlling the flow of fluid therethrough. My invention more particularly relates to the provision of pipes with valves permitting the flow of fluid therethrough to be controlled from any one of three or more points, regardless of distance therebetween, so that the fluid flow through a system as a whole may be stopped or started from any one selected of three or more valve control points at any time, and this by merely operating a valve at such one selected valve control point, and without the necessity for changing the position of any of the valves at any of the other such valve control points.

Various other objects and advantages of the invention will be obvious from the following particular description of embodiments of my invention.

The various features of novelty which characterize my invention are pointed out with particularity in the claim annexed hereto and forming a part of this specification, but for a better understanding of the invention, however, its advantages and specific objects obtained with its use, reference should be had to the accompanying drawing and descriptive matter in which I have illustrated and described the best forms of my invention.

In the accompanying drawing

Fig. 1 is a diagrammatic view of my invention.

Figs. 2, 3 and 4 are cross-sectional views of various forms of compound valves which may be utilized in my invention.

Fig. 5 is a cross-sectional view on line 5—5 of Fig. 4.

Figs. 6, 7 and 8 are cross-sectional views of still other forms of compound valves which may be utilized in my invention.

As shown in Fig. 1 of the drawing, an inlet fluid-supply pipe 10 communicates with two inlet pipe branches, identified as upper inlet branch pipe 11 and lower inlet branch pipe 12, while an outlet fluid-supply pipe 13 communicates with two outlet pipe branches, identified as upper outlet branch pipe 14 and lower outlet branch pipe 15. In upper inlet branch pipe 11 and lower inlet branch pipe 12 are located valves 16 and 17, respectively, which are connected by valve arms 16' and 17', respectively, to connecting link 17" for simultaneous movement, so that when valve 16 is open, valve 17 is closed, and when valve 17 is open, valve 16 is closed. Similarly, in upper outlet branch pipe 14 and lower outlet branch pipe 15 are located valves 18 and 19, respectively, which are connected by valve arms 18' and 19', respectively, to connecting link 19" for simultaneous movement, so that when valve 18 is open, valve 19 is closed, and when valve 19 is open, valve 18 is closed. However, instead of being controlled by valves of the type shown in Fig. 1, the inlet branches and the outlet branches may be provided with other forms of valves which would permit the flow in one of such two inlet branches to be open when the flow in the other of such two inlet branches is closed, and similarly will permit the flow in one of such two outlet branches to be open when the flow in the other of such two outlet branches is closed.

Communication between upper inlet branch pipe 11 and upper outlet branch pipe 14 is provided by upper central pipe section 20, in which is located the valve 21. Lower central pipe section 22 communicates directly with lower inlet branch pipe 12 and also communicates, through cross-connecting pipe 23, with upper central section 20 and upper outlet branch pipe 14 at a point 24 intermediate the valves 21 and 18. In lower central section 22 is located a valve 25, which is connected with valve 21 by their respective valve arms 25' and 21' to a link 25" for simultaneous movement, so that when valve 21 is open, valve 25 is closed and when valve 25 is open, valve 21 is closed. Lower outlet branch pipe 15 communicates with intermediate upper branch 26 and intermediate lower branch 27. Of these, intermediate upper branch 26 communicates with lower inlet branch pipe 12 and lower central section 22 at a point 28 intermediate valves 17 and 25, while intermediate lower branch 27 communicates with upper inlet branch pipe 11 and upper central section 20 at a point 28' intermediate valves 16 and 21. In intermediate upper branch 26 is located a valve 29 which is connected with valve 21 by their respective valve arms 29' and 21' to link 25" for simultaneous opening and closing movement. In intermediate lower branch 27 is located a valve 30 which is connected with valve 25 by their respective valve arms 30' and 25' to link 25" for simultaneous opening and closing movement.

In the form of the invention shown in Fig. 2, a compound valve body 200 of a rotary plug form fits rotatably within a cylindrical valve casing 201 to which is removably secured a valve head 202 having a central round aperture therethrough to receive in watertight relation a cylindrical valve stem 203 connecting the valve body 200 to a handle 204 for operating such compound valve. In the valve body 200 are four ports 205, 206, 207 and 208 which are so related that when valve 200 is turned so as to open pipe 220 through port 205, it simultaneously opens pipe 226 through port 206, and at the same time closes both pipe 227 and pipe 222 through ports 207 and 208, respectively, since such latter two ports 207 and 208 extend at right angles to ports 205 and 206. Upon rotating the valve 200 through 90 degrees it will be obvious that the ports 207 and 208 may be put in communication with pipes 227 and 222, respectively, and at the same time ports 205 and 206 will be moved out of registration and communication with pipes 220 and 226, respectively.

In the form of the invention shown in Fig. 3, a compound valve 300 of a reciprocating plug form fits slidably within a cylindrical valve casing 301 to which is removably secured a valve head 302 having a central square aperture therethrough to receive in watertight relation a square stem 303 connecting the valve body 300 with a handle 304 for operating such compound valve. In the valve body 300 are four ports 305, 306, 307 and 308 which are substantially parallel to each other and so spaced apart that when the valve 300 is in the position shown in Fig. 3 to open pipe 320 through port 305, it simultaneously opens pipe 326 through port 306, and at the same time closes both pipe 327 and pipe 322 through ports 307 and 308, respectively, since such latter ports 307 and 308 in such position are out of register with pipes 327 and 322, respectively. Upon reciprocating the valve 300 upwardly from the position shown in Fig. 3, it will be obvious that the ports 307 and 308 may be put in communication with pipes 327 and 322, respectively, and at the same time ports 305 and 306 will be moved out of register and communication with pipes 320 and 326, respectively.

In the form of the invention shown in Figs. 4 and 5, a compound valve stem 402, having its outer end provided with an operating handle 403, is threaded through the upper end 404 of a compound valve casing which is divided into chambers 405, 406, 407, 408 and 409 by partition walls apertured to provide valve seats 406', 407', 408' and 409' for valves 406", 407", 408" and 409", respectively, which valves are integral with or mounted on the valve stem 402 which extends centrally through the valve casing and is guided therein by having its lower end slidable in a socket 410 in the bottom of the valve casing. Inlet pipes 411 and 412 open directly into chambers 406 and 408, respectively, and outlet pipes 414 and 415 open directly into chambers 405 and 407, respectively, while branch pipe 423 connects chamber 409 with outlet pipe 414.

The form of the invention shown in Fig. 6 differs from that shown in Fig. 4 only in providing a partition 613 to divide the central chamber into upper and lower spaces, respectively 616 and 617, and in providing the outlets of chamber 605, upper space 616 and lower space 617 and chamber 610 with one-way check valves 618, 619, 620 and 621, respectively.

Referring to both Figs. 4 and 6, it is pointed out that, instead of being threaded, the valve stem might be un-threaded and have a sliding reciprocating movement similar to that of well-known valves in an internal combustion engine.

In the form of the invention as shown in Fig. 7 of the drawing, upper inlet pipe 711 and lower inlet pipe 712 correspond with upper inlet branch pipe 11 and lower inlet branch pipe 12 of Fig. 1, and similarly upper outlet pipe 714 and lower outlet pipe 715 correspond with upper outlet branch pipe 14 and lower outlet branch pipe 15 of Fig. 1. A cylindrical valve casing 720 is provided with diametrically opposite ports 721 and 722 which are in communication with inlet pipe 711 and outlet pipe 714. Similarly a cylindrical valve casing 723 is provided with diametrically opposite ports 724 and 725 which are in communication with inlet pipe 712 and outlet pipe 715, respectively. Spaced 90 degrees from the ports 721 and 722 in valve casing 720 are diametrically opposite ports 726 and 727 which are in communication with cross-connecting pipe 728 and upper branch pipe 729, respectively. Similarly, spaced 90 degrees from the ports 724 and 725 in valve casing 723 are diametrically opposite ports 730 and 731 which are in communication with cross-connecting pipe 732 and lower branch pipe 733, respectively. Cross-connecting pipe 728 connects with inlet pipe 712 at point 734 while cross-connecting pipe 732 connects with inlet pipe 711 at point 735. Also branch pipe 729 leads into outlet pipe 714 at point 736, while branch pipe 733 leads into outlet pipe 715 at point 737. Rotatably mounted within valve casings 720 and 723 are valve plugs 738 and 739, respectively, which are connected by valve arms 740 and 741, respectively, to connecting link 742 for simultaneous movement. However, instead of being mounted as shown in Fig. 7, the valves may be mounted and linked together in any suitable manner, as for example, they may be mounted one above the other and their respective valve plugs rotated simultaneously by the same valve post or stem. Extending diametrically through plug 738 is a port 743 which is adapted in one position to put in communication the oppositely positioned casing ports 721 and 722, and in another position to put in communication the oppositely positioned ports 726 and 727. Similarly, extending diametrically through plug 739 is a port 744 which is adapted in one position to put in communication the oppositely positioned casing ports 724 and 725, and in another position to put in communication oppositely positioned ports 730 and 731.

In the form of the invention shown in Fig. 8, a compound valve body 800 of a rotary plug form fits rotatably within a cylindrical valve casing 801. Equally spaced circumferentially in the valve casing 801 and all in the same plane, are four ports 802, 803, 804 and 805 which are in communication respectively with inlet pipe 811, outlet pipe 814, outlet pipe 815 and inlet pipe 812. Valve plug 800 is provided with two curved conduits 806 and 807, each of which has two end openings through the circumference of the plug at points 90 degrees from each other, and one of such openings in one curved conduit is spaced circumferentially 90 degrees from the adjacent opening of the other curved conduit. As shown in Fig. 8, the plug is in position with arrow 809 in Fig. 8, the plug is in position with arrow 809 registering with arrow 808 on the casing, so that the curved conduit 806 establishes communication between casing ports 802 and 804, and at the same time the other curved conduit 807 establishes communication between casing ports 803 and 805, but it is obvious that when the plug is rotated through 90 degrees so that the arrow 809 will register with arrow 810 on the casing, the curved conduit 806 will then establish communication between casing ports 802 and 803, and at the same time the other curved conduit 807 will establish communication between casing ports 804 and 805.

In considering the operation of the invention shown in Fig. 1 and hereinbefore described, it is to be noted that three groups or sets of valves, 16—17 and 21—29—30—25, provide the fluid system with thre separate valve control points. Thus, in addition to designating such three separate valve groups, respectively, it will be understood that the reference characters A, B and C also indicate the three separate valve control points that are formed by such three separate valve groups.

Also, it is to be noted that although there is separate and independent action between valve groups, that is not true of the individual valve units in each valve group, where movement of one valve unit of a valve group causes simultaneous movement of all other valve units in that same valve group. For example, in Group A, the link connection between the valves 16 and 17 results in either of them being open when the other is closed. Similarly, in Group C, the link connection between the valves 18 and 19 results in either of them being open when the other is closed. However, in the case of Group B, the link connection between the upper pair of valves 21—29 and the lower pair of valves 30—25 results in both of the upper pair of valves being open when both of the lower pair of valves are closed, and conversely results, of necessity, in both of the lower pair of valves being open when both of the upper pair of valves are closed.

In the following description of operation, it is to be borne in mind that the purpose of the invention is to be able to stop the fluid flow, if started, or start the fluid flow, if stopped, in the system as a whole, from any valve control point, regardless of the particular positions of the valves at other valve control points, and regardless of how great the distance between such valve control points. In short, the object is to provide means whereby the fluid flow may be stopped or started from any one selected of three or more valve control points at any time, and this, by merely operating a valve at such one selected valve control point, and without the necessity for changing the positions of any of the valves at any of the other such valve control points.

An understanding of the operation of the form of the invention shown in Fig. 1 may be aided by letting O represent the open position, and X represent the closed position, of each upper valve or of each upper pair of valves, in each valve group, and then it will be seen that the following combinations of positions are possible in the fluid system:

| Flow started | | | Flow stopped | | |
|---|---|---|---|---|---|
| Group A | Group B | Group C | Group A | Group B | Group C |
| O | O | O | X | X | X |
| O | X | X | X | O | O |
| X | O | X | O | X | O |
| X | X | O | O | O | X |

Thus, as pipes and valves are shown in Fig. 1, any of the valve combinations indicated in the above left-hand column maintains the flow through the fluid system as a whole, while any of the valve combinations indicated in the above right-hand column stops the flow through the fluid system as a whole. Also, it will be seen that any change in any of the "Flow started" combinations will produce a "Flow stopped" combination, and any change in any of the "Flow stopped" combinations will produce a "Flow started" combination.

By way of illustration, if consideration is given to the first of the "Flow started" combinations in the above list, the situation thus presented in Fig. 1 is that upper valve 16 (Group A) and upper va've 21 (Group B) and upper valve 18 (Group C) are all open, which results in the flow being maintained through the system as a whole. However, in this combination, in case upper valve 18 were moved from open to closed position, that would stop the flow of fluid through the system as a whole, since then the fluid would have free passage through valves 16 and 21, but would be stopped from continuing on through the "now closed" valve 18 and would be stopped from by-passing through the "now open" valve 19 (because of link connection, valve 19 being open when valve 18 is closed) by reason of such by-passing being necessarily through intermediate branch pipe 27, in which valve 30 is still closed, due to its link connection with the "still open" valve 21 of this combination under consideration. Similarly, in the event of, instead of valve 18, the valve 21 were closed, there would be a stopping of flow through the system as a whole, because then the fluid could by-pass such closed valve 21 only through the intermediate branch 27 (wherein now open valve 30 would permit passage therethrough), but from branch 27 the fluid would be led into the lower main branch where the "still closed" valve 19 would stop flow therethrough. Similarly, in the event of, instead of valve 18 or valve 21, the valve 16 were closed, there would be a stopping of flow through the system as a whole, because the fluid could then pass through the "then open" valve 17 but could not pass from there through either the "still closed" valve 25 or the "still closed" valve 19. Thus, as above explained, by closing any one (either 18 or 21 or 16) of the valves in the above-identified "Flow started" combination 16—21—18 it will be seen that the flow through the system as a whole will be stopped thereby.

On the other hand, by way of illustration, if cons'deration is given to the first of the "Flow stopped" combinations in the above list, the situation thus presented would be that upper valve 16 (Group A) and upper valve 21 (Group B) and upper valve 18 (Group C) would all be closed, which would result in the flow being stopped through the system as a whole. However, in this combination, in case upper valve 16 were moved from closed to open position, that would start the flow of fluid through the system as a whole, since then the fluid would have free passage through such "now open" valve 16, and although stopped by the "still closed" valve 21, the fluid could by-pass by way of intermediate branch 27 through "still open" valve 30 (Group B) and from there continue through the "still open" valve 19 (Group C). Similarly, in this same last-mentioned combination, in the event of, instead of valve 16, the valve 21 were opened, that would start the flow through the system as a whole, since then the fluid would have free passage through the "still open" valve 17 (due to its link connection with "still closed" valve 16) and then by way of intermediate branch 26 through "now open" valve 29 and thence continue through the "still open" valve 19. Simi'arly, in this same last-mentioned combination, in the event of, instead of either valve 16 or 21, the valve 18 were opened, that would start the flow through the system as a whole, since then the fluid would have free passage through the "still open" valve 17 (Group A) and thence through the "still open" valve 25

(Group B) and then continue by way of the cross-connection 23 through the "now open" valve 18. Thus, as above explained, by opening any one (either 16 or 21 or 18) of the valves in the above-identified "Flow stopped" combination 16—21—18 it will be seen that the flow through the system as a whole will be started thereby.

Without applying the same detailed analysis (as above applied to both open combination "Flow started" 16-21-18 and also closed combination "Flow stopped" 16-21-18) to each of the other three open combinations and to each of the other three closed combinations listed earlier in this description of the operation of the invention shown in Fig. 1, it is desired to emphasize that it is possible, regardless of how far removed from each other are valve groups A, B and C, to control the flow through the system as a whole, from any one of the control points A, B or C, irrespective of how the valves have been left, either open or closed, at the other two control points.

Furthermore, although shown in Fig. 1 as applied to only three (3) valve groups, the invention may be applied to more than three valve groups. In fact, the number of valve groups like "Group B" which may be added in series between the two end valve groups A and C is unlimited. In any case, the fluid system will still be subject to control from any one of such more than three valve control points at any time.

In the foregoing, I have described the operation of the invention as shown in Fig. 1 of the drawing, but instead of the valve group identified as Group B being composed of valves of the particular form and arrangement shown in such Fig. 1, it is pointed out that such Group B may be composed of compound valves of other forms, such as those illustrated in Figs. 2 to 8, inclusive, of the drawing.

For example, in Fig. 2 there is an arrangement and inter-connection of pipes similar to that shown in Fig. 1, but with a rotary-plug-type compound valve substituted for the valves comprising Group B in Fig. 1. Thus, as shown in Fig. 2, the upper pair of ports are open and the lower pair of ports are closed, but when the valve plug carrying 11 such upper and lower pairs of ports is rotated through 90 degrees, then the upper pair of ports close and the lower pair of ports open.

Again, in Fig. 3 there is an arrangement and inter-connection of pipes similar to that shown in Fig. 1, but with a reciprocating-plug-type compound valve substituted for the valves comprising Group B in Fig. 1. Thus, as shown in Fig. 3, the upper pair of ports are open and the lower pair of ports are closed, but if the valve plug carrying all such upper and lower pairs of ports is raised, then the lower pair of ports will open and the upper pair of ports will be closed.

Next, turning to Fig. 4, it will be observed that there are no intermediate branch pipes corresponding to intermediate branch pipes 26 and 27 of Fig. 1, but in Fig. 4 the inlet pipes 411 and 412 and the outlet pipes 414 and 415 correspond, respectively, to inlet pipes 11 and 12 and outlet pipes 14 and 15 of Fig. 1, while in Fig. 4 the cross-connecting pipe 423 corresponds to the cross-connecting pipe 23 of Fig. 1. Also, in Fig. 4, the four (4) valves are mounted on the single valve stem so that the first and third valves are both seated when the second and fourth valves are both raised and thus open, and conversely when the second and fourth valves are both seated, the first and third valves are both raised and thus open.

With the compound valve and cross-connecting pipe shown in Fig. 4 substituted for the Group B valves and cross-connecting pipes of Fig. 1, it will be clear what will happen under various conditions possible to exist in such Groups A, B and C. Thus for example, assuming that the end valves controlling inlet pipe 411 and outlet pipe 415, respectively, are both open, then in the position of the valve shown in Fig. 4, it will be obvious that the flow will be started through the system as a whole, because then the flow will be from "open valved" inlet pipe 411 into chamber 406, past open valve 407", into chamber 407, and thence into "open valved" outlet pipe 415. However, if, instead of both being assumed to be "open valved", it be assumed that inlet pipe 411 is still "open valved", but that outlet pipe 415 is changed to "closed valved", then it will be obvious that the flow will be stopped through the system as a whole, because then the flow will be through "open valved" inlet pipe 411, into the chamber 406, past open valve 407", into chamber 407, and thence into "now closed valved" outlet pipe 415. Again, if, instead of both being assumed to be "open valved", it be assumed that outlet pipe 415 is still "open valved", but that inlet pipe 411 is changed to "closed valved", then it will be obvious that the flow will be stopped through the system as a whole, because then the flow will be through "open valved" inlet pipe 412 (by reason of its companion inlet pipe 411 being changed to "closed valved"), into chamber 406, past open valve 409", into chamber 409, and thence by way of cross-connection 423 into the "closed valved" outlet pipe 414 (by reason of its companion outlet pipe 415 being still "open valved").

On the other hand, if such inlet pipe and outlet pipe, 411 and 415 respectively, were both still assumed to be "open valved", but the valve stem 402 were assumed to be screwed down so that the valve 407", instead of being shown raised from its seat as in Fig. 4, would be moved to seated position, resulting in the valve 406" being simultaneously moved off its seat, then it would be obvious that the flow would be stopped through the system as a whole, because then the flow would be from "open valved" inlet pipe 411 into chamber 406, past open valve 406", into chamber 405 and thence into outlet pipe 414, which is closed valved by reason of its companion outlet pipe 415 being still assumed to be "open valved". However, if the valve stem 402 be again assumed to be screwed down so that the valve 407" is moved to seated position from its open position shown in Fig. 4, but if, instead of both being assumed to be "open valved", it be assumed that inlet pipe 411 is still "open valved" and outlet pipe 415 is changed to "closed valved", then it will be obvious that the flow will be started through the system as a whole, because then the flow will be through open-valved inlet pipe 411, into chamber 406, past "now open-valved" 406", into chamber 405, and thence into "open valved" outlet pipe 414 (by reason of its companion outlet pipe 415 in this example assumed to be "closed valved"). Again, if the valve stem 402 be still assumed to be screwed down so that valve 407" is moved to seated position from its open position shown in Fig. 4, and also, if, instead of both being assumed to be "open valved", it be assumed that outlet pipe 415 is still "open valved" but inlet pipe 411 is changed to "closed valved", then it will be obvious that the flow will be started through the system as a whole, because then the flow will be through "open valved" inlet pipe 412 (by reason of its companion inlet pipe 411 being assumed to be changed to "closed valved"), into chamber 408, past "now open" valve 408", into chamber 407, and thence into "open valved" pipe 415.

Next, turning to Fig. 6, the general valve form is the same as in Fig. 4, except for the addition of the partition 613 and the provision of the one-way check valves 618, 619, 620 and 621 in passage-ways as shown leading from the different valves. Without repeating the operation of the form of the invention shown in Fig. 4, it is to be noted that such Fig. 4 operation is the same as that of Fig. 6, except that in Fig. 6 the partition and check-valves positively prevent back pressure on those valves which are in closed or seated position. For example, fluid flowing past check-valve 621 and thence through cross-connecting pipe 623 into outlet pipe 614 is prevented by check valve 618 from exerting back pressure on "now closed" valve 606, and similarly, fluid flowing past check valve 619 is prevented by check valve 620 from exerting back pressure on "now closed" valve 608.

Next, turning to Fig. 7, the valve structure and certain of the pipe arrangements and connections differ from those in Fig. 1, but the same ultimate result is attained thereby in the control of the fluid flow from any one of three or more valve control points. With the compound valve and connecting pipes shown in Fig. 7 substituted for Group B valves and cross-connecting pipes shown in Fig. 1, it will be obvious what will happen under various conditions possible to exist in such Groups A, B and C. Thus, for example, if the end valves controlling inlet pipe 711 and outlet pipe 714 are both assumed to be "open valved", then, in the position of the valves shown in Fig. 7, the flow will start in the system as a whole, because then the flow will be from "open valved" inlet pipe 711 successively through registering ports 721, 743, and 722 into "open-valved" outlet pipe 714. However, if instead of both being assumed to be "open valved", it be assumed that inlet pipe 711 is still "open valved", but that outlet pipe 714 is changed to "closed valved", then it will be obvious that the flow will be stopped through the system as a whole because then the flow will be from "open valved" inlet pipe 711, successively through registering ports 721, 743 and 722, into "now closed valved" outlet pipe 714. Furthermore, in this same situation, the flow will, from "open valved" pipe 711 through cross-connecting pipe 732, be stopped by the valve port 744 in the compound valve 739 being out of register with such cross-connecting pipe 732. Again, if instead of both being assumed to be "open valved", it be assumed that outlet pipe 714 is still "open valved", but that inlet pipe 711 is changed to "closed valved", then it will be obvious that the flow will be stopped through the system as a whole, because then the flow will be from "open valved" inlet pipe 712 (by reason of its companion pipe 711 being now assumed to be "closed valved"), by way of cross-connecting pipe 728, and then completely stopped by the valve port 743 in the valve 738 being out of register with such cross-connecting pipe 728. Furthermore, in this same situation, the flow from open-valved pipe 712, through successively ports 724, 744 and 725, into outlet pipe 715 would be stopped by reason of such outlet pipe 715 being "closed valved" (by reason of its companion outlet pipe 714 being assumed to be "open valved").

On the other hand, if such inlet pipe 711 and outlet pipe 714 be both assumed to be "open valved", but the valves 738 and 739 be turned through 90 degrees, that would stop the flow through the system as a whole because then the fluid, after having free passage through the "open-valved" inlet pipe 711, would be stopped, by reason of the valve port 743 being now turned out of register with pipe 711. Furthermore, in this same situation, such fluid could by-pass such closed valve 738 only by way of cross-connecting pipe 732, thence through port 744 (now in register therewith), but from such port 744 the fluid would be led through branch 733 into outlet pipe 715, which, being "closed valved" would stop flow therethrough. However, if the valves 738 and 739 be still assumed to be turned through 90 degrees from their positions shown in Fig. 7, but instead of both being assumed to be "open valved", it be assumed that inlet pipe 711 is still "open valved", but outlet pipe 714 is changed to "closed valved", then it will be obvious that the flow will be started in the system as a whole, because then the flow will be from "open valved" inlet pipe 711, thence by way of the connecting pipe 732, through the valve port 744 (now in register therewith by reason of valve 739 being assumed to be turned 90 degrees), and thence into the registering branch pipe 733, thence into outlet pipe 715 (now "open valved" by reason of its companion pipe 714 being now assumed to be "closed valved"). Again, if the valves 738 and 739 be still assumed to be turned through 90 degrees from their positions shown in Fig. 7, but instead of both being assumed to be "open valved", it be assumed that outlet pipe 714 is still "open valved" but inlet pipe 711 is changed to "closed valved", then it will be obvious that the flow will be started through the system as a whole, because then the flow will be from "open valved" inlet pipe 712 (by reason of its companion pipe 711 being now assumed to be changed to "closed valved"), by way of cross-connecting pipe 728, through valve port 743 registering therewith, thence into branch pipe 729, and thence into outlet pipe 714 (still assumed to be "open valved").

Finally, of all the different forms of compound valve suggested herein for use as substitutes for the valves in Group B of Fig. 1, the simplest and most compact is that shown in Fig. 8. Thus, for example, if the end valves controlling inlet pipe 811 and outlet pipe 814 are both open, then in the position of the valve in Fig. 8, the flow in the system as a whole will be stopped, because then the flow will be from the "open valved" inlet pipe 811, successively through ports 802, 806 and 804, into outlet pipe 815, which is assumed to be "closed valved" (by reason of its companion pipe 814 being assumed to be "open valved"). However, if, instead of both being assumed to be "open valved", it be assumed that inlet pipe 811 is still "open valved", but outlet pipe 814 is changed to "closed valved", then it will be obvious that the flow will be started through the system as a whole, because then the flow will be from the "open valved" inlet pipe 811, successively through ports 802, 806 and 804, into outlet pipe 815, which is now open valved (by reason of its companion pipe 814 being assumed to be changed to "closed valved"). Again, if, instead of being assumed to be both "open valved", it be assumed that outlet pipe 814 is still "open valved", but inlet pipe 811 is changed to "closed valved", then it will be obvious that the flow will be started through the system as a whole, because then the flow will be from "open valved" inlet pipe 812 (by reason of its companion inlet pipe 811 being now assumed to be changed to "closed valved"), successively through ports 805, 807 and 803 into "open valved" outlet pipe 814.

On the other hand, if such inlet pipe 811 and outlet pipe 814 were both assumed to be "open valved", but the valve 800 be turned through 90 degrees, so that the arrow 809 registers with the arrow 810, then that would start the flow of fluid through the system as a whole, because then the flow would be from "open valved" inlet pipe 811, successively through ports 802, 806 and 803, into "open valved" outlet pipe 814. However, if the valve 800 be still assumed to be moved through 90 degrees from its position shown in Fig. 8, but instead of both being assumed to be "open valved", it be assumed that inlet pipe 811 is still "open valved" and outlet pipe 814 be changed to "closed valved", then the flow will be stopped through the system as a whole, because then the flow would be from the "open valved" inlet pipe 811, successively through ports 802, 806 and 803, into outlet pipe 814, now assumed to be "closed valved". Again, if the valve 800 be still assumed to be moved through 90 degrees from its position shown in Fig. 8, but instead of both being assumed to be "open valved", it be assumed that outlet pipe 814 is still assumed to be "open valved", but inlet pipe 811 be assumed to be changed to "closed valved", then the flow will be stopped through the system as a whole because then the flow would be from the "open valved" pipe 812 (by reason of its companion pipe 811 being assumed to be "closed valved"), successively through ports 805, 807 and 804, into outlet pipe 815, which is still "closed valved" (by reason of its companion pipe 814 being still assumed to be "open valved").

What I claim is:

A system for controlling flow through a pipe line at any one of a plurality of stations therein which comprises a pipe line formed by an inlet section and an outlet section in communication with each other solely by first and second conduits each of which communicates at its inlet end with the inlet section and at its outlet end with the outlet section, a two way valve in each first and second conduit arranged to be operated together so that one is open when the other is closed, said valves together forming a valve unit, a similar valve unit spaced from the first mentioned unit and a flow control unit spaced between the first and second valve units comprising a valve means in said first and second conduits and dividing each of said conduits into an inlet section and an outlet section, said valve means being constructed and arranged in one of its positions to effect flow directly through both of said first and second conduits and in another of its positions to effect flow from the inlet portion of the first conduit to the outlet of the second conduit and from the inlet portion of the second conduit to the outlet portion of the first conduit.

JOHN BRENDAN HENNESSY.